United States Patent Office 2,758,583
Patented Aug. 14, 1956

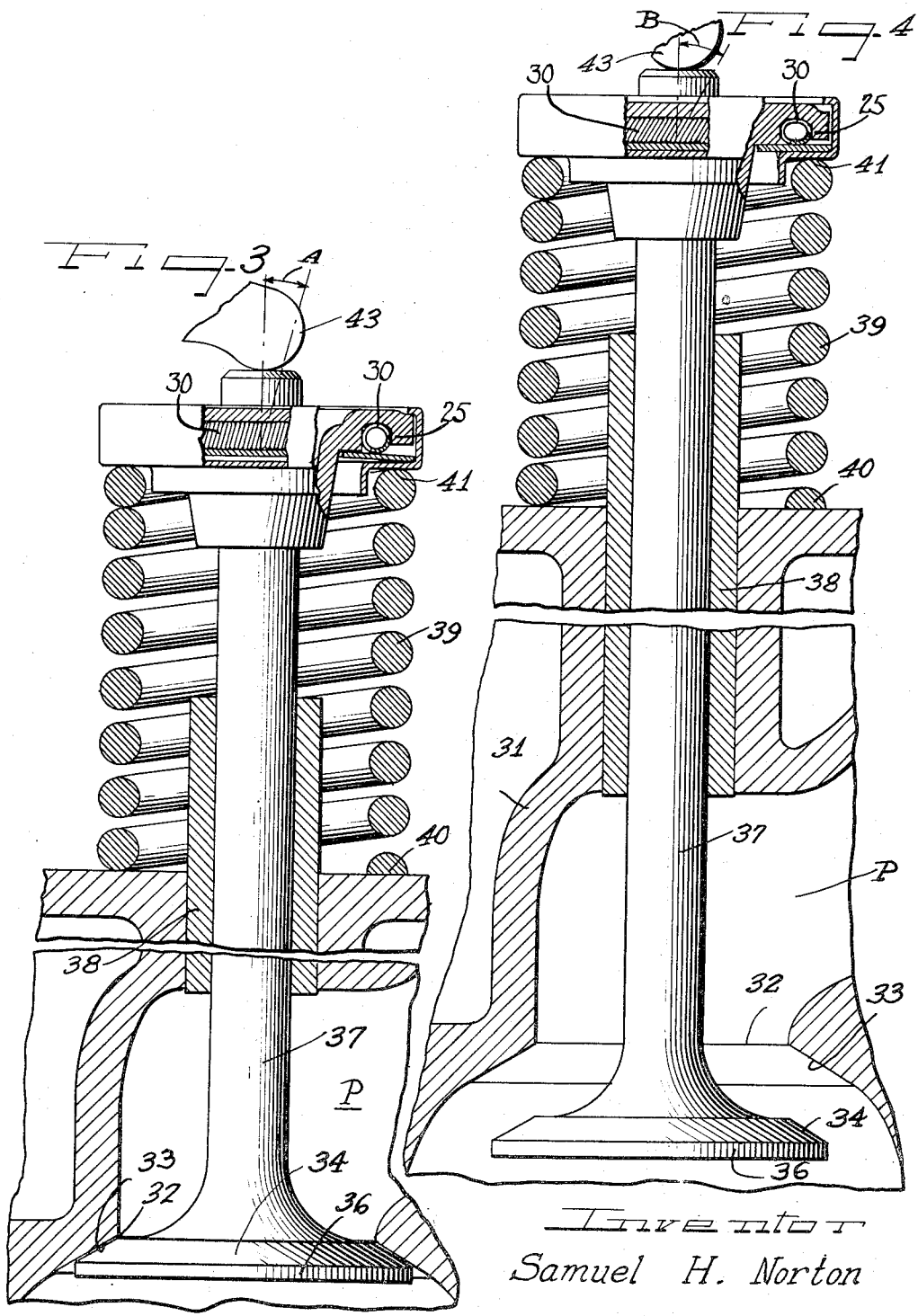

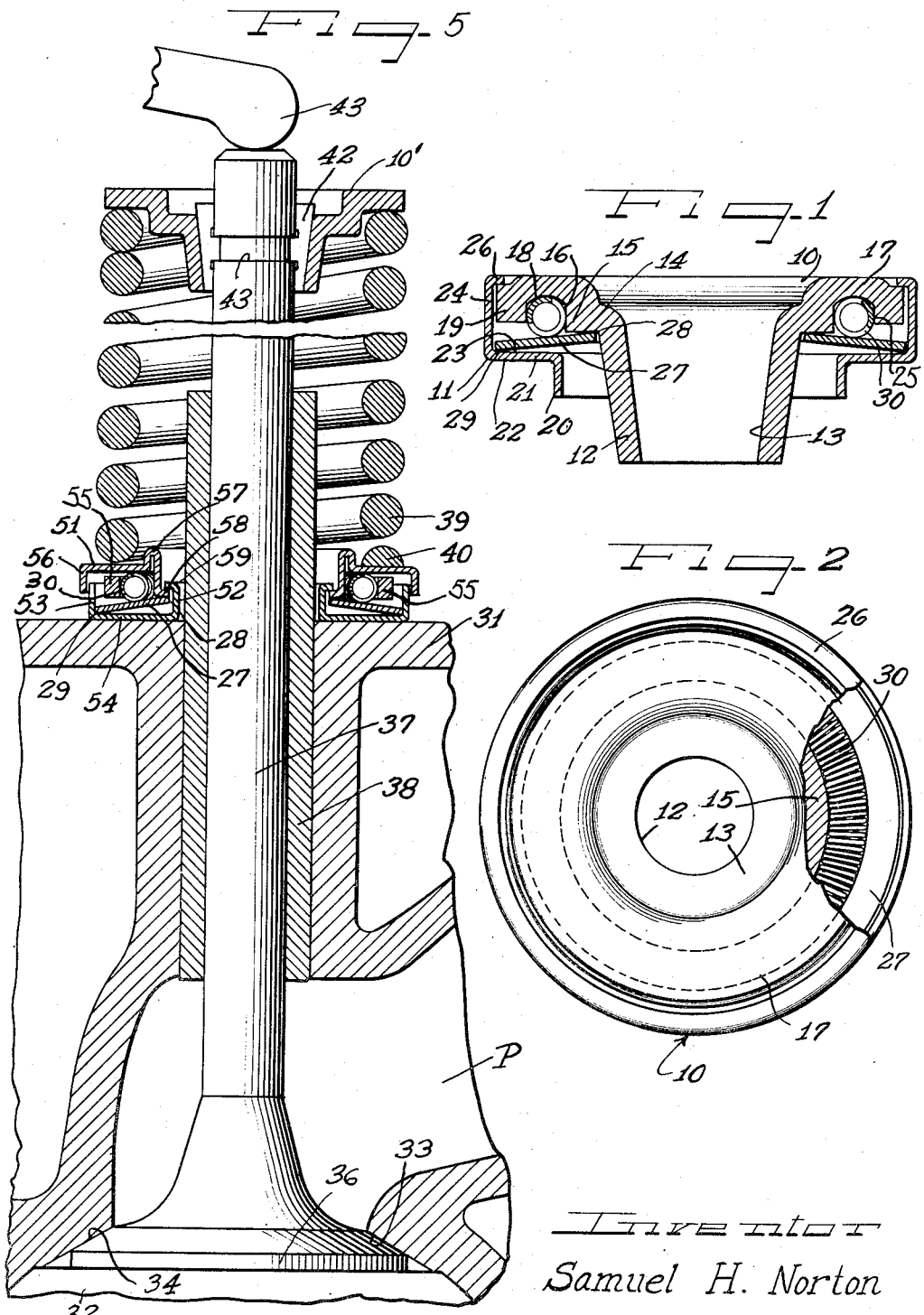

2,758,583

VALVE ROTATING DEVICE

Samuel H. Norton, University Heights, Ohio, assignor to Thompson Products, Inc., Cleveland, Ohio, a corporation of Ohio Application August 4, 1954, Serial No. 447,784

26 Claims. (Cl. 123—90)

This invention relates generally to a device for rotating two axially adjacent parts in response to varying axial loads and more particularly relates to a valve rotating device wherein two separated axially loaded relatively rotatable parts of a poppet valve assembly are interconnected by a conical spring washer and a band tension spring or garter spring so that increased loads tending to bring the axially loaded parts together will be supported across the transverse axis of the spring until the restriction against turning between the parts is removed, whereupon the tipping of the spring coils will rotatably drive the parts for relative angular displacement.

Although the principles of the present invention are of general utility, a particularly useful application is found in connection with the provision of valve rotating devices. It is highly desirable to provide means for rotating engine valves since cyclic rotation of the valves during the course of operation thereof assists in eliminating valve burning as well as wearing, pitting and stem galling and scoring.

It is a particular object of the present invention to provide a valve rotating device which utilizes a reduced number of simplified parts that are inexpensive to make and which are easily fabricated and conveniently assembled.

A further object of the present invention is to provide a valve rotating device which will be particularly light and compact and which will not add excessive weight to the valve cap.

Yet another object of the present invention is to provide a valve rotating device that can be conveniently installed on most contemporary engines not already equipped with valve rotating devices, or which may also be conveniently utilized as new equipment.

Still another object of the present invention is to provide an improved valve rotating device which may be conveniently installed at either end of the valve spring.

Another object of the present invention is to provide a valve rotating device which utilizes novel and useful shiftable means which will effect a much more uniform strain and stress distribution pattern throughout the circumferential extent of a valve rotating device than has been heretofore possible.

Many other features, advantages and additional objects of the present invention will become manifest to those versed in the art upon making reference to the detailed description which follows and the accompanying sheets of drawings in which a preferred structural embodiment of a valve rotating device incorporating the principles of the present invention is shown by way of illustrative example.

Figure 1 is a cross-sectional view of a valve rotating device provided in accordance with the principles of the present invention;

Figure 2 is a plan view with parts broken away to illustrate additional features of construction showing the valve rotating device of Figure 1;

Figure 3 is a fragmentary view showing a valve rotating device according to the principles of the present invention applied to the poppet valve assembly of an internal combustion engine and with parts broken away and with parts shown in cross-section to illustrate the positioning of the components when the valve is raised a small amount off of the valve seat and with the valve rotating device at the start of a typical valve-rotating cycle;

Figure 4 is a view similar to Figure 3 but showing the valve completely lifted from the seat and illustrating at the broken away portions and the parts shown in cross-section the components of the valve-rotating device at the end of the valve-rotating period; and Figure 5 is a view similar to Figures 3 and 4 but showing an alternative embodiment wherein the valve rotating device of the present invention is installed between the valve spring and an engine part.

As shown on the drawings:

Before explaining in detail the structural embodiment of the principles of the present invention, it may be noted that the present invention advantageously exploits the peculiar characteristics of a band tension spring or garter spring, namely, that if a band spring is placed between two flat plates which are held against rotation, relative to each other, and then a load is applied to one of the plates tending to press the plates together against the spring, the spring will support this load even though it be great. This phenomenon is explained by the fact that there are a large number of coils in the spring, each of which carries a portion of the load which is directed transverse to the normal axis of the helically wound coils.

If the restriction against relative rotation is removed from one of the compression plates, the spring will be transversely compressed by virtue of the tilting action of the coils falling forwardly or backwardly. The relative translation of the opposite sides of each respective loop or coil will rotatively drive the relatively rotatable parts.

Referring now more specifically to the particular embodiment herein described by way of illustrative example, it will be noted that the axially adjacent relatively rotatable parts are provided respectively by a valve cap indicated at 10 and a collar member indicated at 11.

The valve cap 10 has a generally cylindrical body portion 12 which is axially tapered so as to provide a bore 13 through which the end of a valve stem may be passed.

Near the top of the valve cap 10 is provided an annular shoulder 15 having an annular radially extending wall 14 and an annular axially extending wall 16.

Extending radially outwardly from the annular shoulder 15 is a flange 17 shaped or formed to provide an annular recess 18 bounded by an upstanding annular rib 19.

The collar member 11 includes a generally cylindrical body portion indicated at 20 terminating in a radially outwardly extending annular flange 21. One face or side of the flange is indicated at 22 and provides a valve spring seating surface, while the other face or side of the flange 21 is indicated at 23 and provides a seating surface, the utility of which will become manifest presently.

The flange 21 terminates at its outer periphery in an axially extending wall 24 which is flanged as at 26 to effect a locked together assembly with the offset rib 19 on the flange 17 of the valve cap 10.

Interposed between the valve cap 10 and the collar 11 is a conical spring washer 27 having an inner peripheral edge 28 engaging the radial wall 14 of the annular shoulder 15 and having an outer peripheral edge 29 engaging the surface 23 of the flange 21.

The conical spring washer 27 operates to transmit normal spring loads between the collar 11 and the valve cap 10.

In accordance with the principles of the present invention, a band tension spring or garter spring 30 is effectively utilized as a means for providing shiftable elements between the relatively rotatable parts. It will be understood that the spring 30 conveniently comprises a plurality of helically looped coils or a helically wound coil spring having a multiplicity of individual coils closely spaced with respect to one another so that the helix angle of the individual coils is sufficiently small that the spring 30 will be capable of transmitting forces in a direction transverse to the longitudinal axis of the spring.

The spring 30 can be a band spring with the ends joined by any suitable form of fastener, or it can take the form of one or more closed C-shaped springs held in place in the channel provided by the recess 18 formed in the flange 17 of the valve cap 10. In any event, the spring 30 provides a plurality of coils which are circumferentially spaced apart from one another and which are so arranged as to transmit forces in a transverse direction relative to the center axis thereof since opposite sides of each loop or coil of the spring 30 are arranged to contact the spring washer 27 and the flange 17 of the valve cap 10.

Referring now to Figures 3, 4 and 5, it will be noted that the valve rotating device may be assembled with a poppet valve assembly such as may be employed in an internal combustion engine or the like.

In the embodiment shown, an engine part is indicated at 31 which provides a port indicated at P having a valve opening 32 presenting a beveled valve seat 33 regulated by the beveled seating surface 34 of a valve head 36 carried on the end of a valve stem 37. The stem is slidably carried in the engine part 31 by means of a valve stem guide 38. A valve spring 39 has one end 40 bottomed against the engine part 31 and in Figures 3 and 4 the opposite end indicated at 41 is bottomed against the valve spring seating surface 22 of the flange 21 on the collar 11.

The valve cap 10 or 10' in the embodiment of Figure 5 is locked adjacent the end of the stem 37 by means of a valve stem locking member 42 cooperable with an annular locking groove 43 formed adjacent the end of the stem 37.

For purposes of this disclosure, the valve spring 39 may be considered as having two positions of compression, namely, a first position illustrated in Figure 3 where the spring 39 is in light compression, as when the valve 36 is closed on the seat 33, and the second when the valve 36 is in the open position such as is shown in Figure 4.

As shown in Figure 3, because of the multiplicity of coils in the spring 30, there is sufficient stiffness so that the spring will act like a solid ring and will compress the conical spring washer 27 when an increased pressure is placed on the valve spring 39 due to the valve stem 37 being pressed upon by a rocker arm 43 operatively engaged with the end of the valve stem 37.

Thus, when the valve 36 is pressed open and off at the seat 33, the increased amount of axial force which increases due to the compression of the spring 39 will apply greater and greater pressure between the outer edge of the conical spring washer 27 and the spring 30 until the conical spring washer 27 begins to flatten out. When this occurs, the inner edge 28 of the conical spring washer 27 is raised off of its seat on the radial wall 14 of the annular shoulder 15, thus relieving the restriction against rotation which is ordinarily imposed between the valve cap 10 and the collar 11 by virtue of the interrelationship effected by the conical spring washer 27.

The restriction against rotation having been relieved, the individual coils of the spring 30 tend to be transversely compressed or tilted over. In other words, the normal disposition of the individual coils in the position of Figure 3 where the valve 36 is just barely being moved away from the seat 33, is indicated by the angle A, an angle which would be normally approximately the same as the helix angle of the spring 30. However, when the individual coils tip or are tilted, the coils are disposed at an angle indicated in Figure 4 at B. The angles A and B are measured with respect to a vertical axis passing through the axis of the valve stem 37.

Because of the helically continuous winding of the spring 30, all of the coils will tilt in the same direction and a relative translation will occur between the opposite sides of each individual coil. Since the opposite sides of each individual coil are in contact, respectively, with the flange 17 or with the conical spring washer 27, a relative rotation will occur by virtue of the driving action imparted between the parts and to the parts by the spring 30.

It will also be apparent that when the coils of the spring 30 tip over with respect to one another, the transverse thickness of the spring 30 is also diminished. This decrease in thickness of the spring 30 lessens the axial spacing dimension between the flange 17 of the valve cap 10 and the conical spring washer 27 seated against the flange 21 of the collar 11 with the result that the inner edge 28 of the conical spring washer 27 will again be seated against the radial wall 14 of the annular shoulder 15. Consequently, the valve cap 10 and the collar 11 will be locked against further rotation until the valve spring 39 is further compressed and the cycle is repeated.

It will be understood that when the valve is again closed, the cycle will be completed through an expansion of the valve spring 39, thereby effecting an unloading action on the relatively rotatable parts. When the parts are unloaded, the spring 30 will again resume its normal shape and the conical spring washer 27 will again resume its normal conical position with the inner edge 28 engaged against the radial wall 14 and the outer edge 29 engaged against the surface 23 of the flange 21 on the collar 11.

It may be noted that the pushing over of the band spring coil of the spring 30 is so slight that the spring 30 is not overtaxed, nor is the metal of the spring 30 carried beyond the stress point.

Under normal circumstances, a band spring of the type illustrated in the drawings will have its coils tipped over in one direction when restriction against turning is removed and it is under pressure axially. To insure such a tipping of its coils, the spring may be prestressed in one direction by pressing the coils over beyond their elastic limit. It will also be understood that the clearance between the conical spring washer 27 and the valve cap 10 can be cut down to such an amount as to limit the amount of recovery the individual coils of the spring 30 can make after being pushed over. The coils being pretipped will insure further tipping when axial pressure is increased and restriction against rotation is removed.

The valve rotating device illustrated in Figure 5 embodies the same principles of the structure already described, however, the device is modified to facilitate installation at the bottom of the valve spring 39 instead of at the top. In this embodiment, the valve spring 39 rotates and carries the valve 36 and the stem 37 with it.

The relatively rotatable parts are indicated at 50 and 51 constituting, respectively, an annular channel-shaped member 50 having concentrically spaced walls 52 and 53 separated by a web 54 engaging against the engine part 31.

The part 51 has an outer wall 56 which lies circumjacent the wall 53. A flange 57 is provided on the inner end of the member 51 to seat outwardly the end 40 of the valve spring 39. An inwardly turned flange 58 cooperates with an outwardly turned flange 59 formed on the wall 52 to place the two parts 50 and 51 in assembly with one another. The inner edge 28 of the conical spring washer 27 engages the flange 58 and the outer edge 29 engages the web 54 of the member 50. The spring 30 is interposed between the conical spring washer 27 and the member 51 thereby to develop the functions already described in detail hereinabove.

The two embodiments of Figures 1 and 5 illustrate two forms of structure which may be used to confine the spring coils 30 against kinking or popping out at points along the periphery of the spring means.

In Figure 5, a separate collar member 55 confines the spring 30. In Figure 1, a depending flange 25 circumscribes the groove 18 and depends below the center of the spring 30. The groove 18 may be coined in the cap when it is stamped.

The groove 18 has a radius of curvature larger than the radius of curvature of the spring 30 because as the coils 30 bend over, the surface thereof prescribes an ellipse on the opposite sides of the spring.

Although minor modifications might be suggested by those versed in the art, it should be understood that I wish to embody within the scope of the patent warranted hereon all such modifications as reasonably and properly come within the scope of my contribution to the art.

I claim as my invention:

1. A device for rotating two axially adjacent parts in response to varying axial load comprising a conical spring washer having an inner and outer peripheral axially spaced apart edge engaging the respective axially adjacent parts and transmitting normal axial loads therebetween while restricting the parts against relative rotation, and a helically wound coil spring arranged in an arcuate shape and being concurrently engaged with one of the parts and the spring washer to restrict the loops of the spring against tipping, the helix angle of said spring being sufficiently small and the number of loops of said spring being sufficiently great that increased axial load between said parts will be transmitted by said spring transversely of the axis thereof without substantial deformation of the loops of the spring, whereupon said axially spaced apart edges of said spring washer will be loaded toward one another so that one of said edge portions will be moved out of engagement with a corresponding one of the parts, thereby removing the restriction against relative rotation between the parts, the loops of said spring tipping in response thereto to rotatably drive said one part with respect to the other part and to concurrently decrease the axial spacing dimension between said parts, whereupon said edges will again engage both of said parts, said spring and said washer resuming normal shape and disposition upon unloading of said parts.

2. In combination, two axially loaded parts, load transmitting means between said parts restricting the parts against rotation, band tension spring means between said parts providing a large number of coils each arranged to transmit a portion of the load transversely of the spring and between the parts, said coils engaging said load transmitting means to remove the restriction against rotation in response to increased axial load on the parts, whereupon said coils will tip to rotatably drive one part with respect to the other.

3. In combination, two relatively rotatable axially adjacent parts, a load transmitting means between said parts engaging and restricting said parts against rotation while carrying normal axial loads, and means providing a plurality of circumferentially spaced helically looped coils between one of the parts and said load transmitting means, said coils responding to increased axial load to move said load transmitting means out of the engagement with one of said parts, whereby the rotation restricting relation therebetween is removed, whereupon said coils will tip in a circumferentially extending direction to angularly displace said one part with respect to the other part.

4. The method of rotating two axially adjacent relatively rotatable parts which includes the steps of cyclically loading and unloading the parts with axially directed forces, restricting the parts against rotation at minimum load, transmitting greater than minimum load between the parts through the transversely aligned coils of a helically coiled spring, removing the restriction against rotation on the parts in response to greater than minimum loads, and tipping the coils in response thereto to rotatably drive the parts with respect to one another.

5. The use of a spring having helically wound coils as a rotating device which includes the steps of cyclically loading and unloading axially adjacent relatively rotatable parts, restricting the parts against rotation at minimum load, transmitting greater than minimum load between the parts through said spring coils transversely of the coiling axis thereof, removing the restriction against rotation on the parts in response to greater than minimum loads, and tipping the coils in response thereto to rotatably drive the parts with respect to one another.

6. A valve rotating device comprising a valve stem retainer cap having a boss providing an axially extending annular shoulder, said cap further including a flange extending radially outwardly of said shoulder and forming an annular recess circumjacent said shoulder, a collar member carried on said flange and providing a radially extending wall spaced from said flange opposite said recess, a conical spring washer having one edge seated on one side of said radial wall and having the other edge seated on said shoulder, the opposite side of said radial wall adapted to seat a valve spring, whereby normal spring loads are transmitted from said collar to said cap by said spring washer, and a garter spring having a plurality of helically wound coils received in said recess and having opposite transverse sides of the coils thereof engaging with said spring washer and with said flange, greater than normal spring loading being carried by said coils of said spring to move said other edge of said washer off of said shoulder, whereupon said coils will tip in circumferential direction with respect to said valve stem retainer cap to rotatably drive said cap with respect to said collar.

7. A valve rotating device comprising, a spring seating collar and a valve stem lock member providing a pair of axially adjacent relatively rotatable surfaces, a conical spring washer between said surfaces having spaced apart edges engaging respective surfaces to transmit normal axial loads and to resist relative rotational movement therebetween, and a garter spring between one of said surfaces and said washer to move one of said edges out of engagement with one of said surfaces, in response to increased axial load, whereupon said spring will be transversely compressed as the coils thereof partake of a tilting action, thereby to rotatably drive the surfaces with respect to one another, the spacing dimension between the surfaces being decreased by said compression of said coils to reengage said one edge with said one surface.

8. A valve rotating device comprising a spring seating collar and retainer collar providing a pair of axially separated relatively rotatable parts, a conical spring washer between the collars having inner and outer edges relatively axially spaced with respect to one another and engaging an adjoining surface of a corresponding collar, a band tension spring having a plurality of helically wound coils between said washer and one of said collars transmitting force transversely of said spring through said coils and moving said spring washer out of engagement with one of said collars under increased load, whereupon said coils will tilt to rotatably drive the collars with respect to one another.

9. A device for effecting rotation between two coaxially adjacent parts in response to increased axial loading thereon, which consists of a bowed member interposed between and engaging both parts to restrict the parts against rotation while transmitting normal axial loads therebetween, and a helically wound coil spring disposed with the axis of the spring concentrically outwardly of the rotational axis of the parts and the individual coils interposed transversely and engaging one of said parts and the bowed member to bow said bowed member out of engagement with one of the parts in response to increased axial load, whereupon the coils of the spring will tilt and rotatably drive the parts with respect to one another.

10. A device for effecting rotation between a valve stem part and a spring seating collar part of a poppet valve assembly in response to increased valve spring loading which consists of a bowed member operatively interposed between and engaging said stem part and said collar part to transmit normal spring loading therebetween while restricting the parts against rotation, and a garter spring disposed concentrically of the valve stem part and with its coils interposed transversely between and engaging one of said stem and collar parts and said bowed member to bow said bowed member out of engagement with one of said collar and stem parts in response to increased spring loading, whereupon the coils of the garter spring will tilt to rotatably drive the parts with respect to one another.

11. In a valve rotating device of the type having a valve attached part, a valve spring abutment part and a deflectable spring washer between the parts, the improvement of a garter spring between the washer and valve attached part freeing the washer from the valve attached part when the coils thereof are squeezed and circumferentially translated on opposite sides thereof under open valve spring load to rotate the freed valve attached part.

12. A device for imparting rotation between axially loaded parts comprising a deflectable load transmitting member between the parts, and a coil spring between the member and one of the parts having the coils thereof freeing the member from the other part when squeezed under load and then tipping to rotate the freed part.

13. In a valve rotating device the improvement of a coil spring having the coils thereof squeezed between relatively rotating parts of the device and deformed from their free state contour when subjected to valve opening loads to free the parts for rotation and thereupon tip to effect rotation of the parts.

14. A valve rotating device comprising a valve spring, a valve stem and means interconnecting said valve stem and said valve spring including a garter spring transmitting load therebetween transversely of the axis of the spring and having transversely opposed sides thereof circumferentially translated to rotatively drive the valve stem in response to increased valve load.

15. For use in rotating the valve stem of a poppet valve, a valve cap on the end of said stem, helically wound spring coils having one side thereof engaging said cap with the spring coil axis concentric to said stem, and spring seating collar means engaging the opposite side of the spring coils.

16. For use in rotating the valve stem of a poppet valve, a valve cap on the end of said stem, helically wound spring coils having one side thereof engaging said cap with the spring coil axis concentric to said stem, spring seating collar means engaging the opposite side of the spring coils, and means concentrically outwardly of said spring coils confining the spring coils against kinking and more particularly comprising a separate annular collar member circumscribing the spring coils.

17. For use in rotating the valve stem of a poppet valve, a valve cap on the end of said stem, helically wound spring coils having one side thereof engaging said cap with the spring coil axis concentric to said stem, spring seating collar means engaging the opposite side of the spring coils, and means concentrically outwardly of said spring coils confining the spring coils against kinking and more particularly comprising a flange formed on said cap and extending axially beyond the center of the spring coils and substantially circumscribing said spring coils.

18. For use in rotating the valve stem of a poppet valve, a valve cap on the end of said stem, helically wound spring coils having one side thereof engaging said cap with the spring coil axis concentric to said stem, spring seating collar means engaging the opposite side of the spring coils, and means concentrically outwardly of said spring coils confining the spring coils against kinking.

19. For use in rotating the valve stem of a poppet valve, helically wound spring coils surrounding the valve stem with the spring coil axis concentric to said stem, valve spring seating collar means engaging one side of the spring coils, an annular spring washer engaging the opposite side of said spring coils, and means concentrically outwardly of said spring coils confining the spring coils against kinking.

20. A valve rotating device comprising an engine part having a port to be controlled, a valve having a stem reciprocably mounted in said engine part and having a head controlling the flow of fluid through said port, a coil spring surrounding said stem and operatively connected between said engine part and said valve to exert a continuous biasing force on said valve, a retainer cap on the end of said valve stem, one end of said coil spring being bottomed against said cap, an annular spring seating member having one radial face engaging the other end of said coil spring and having an opposite radial face confronting said engine part, an annular bowed spring washer between said engine part and said spring seating member, and helically wound coil means having the opposite sides of the coils thereof engaging said spring washer and said spring seating member, respectively, to transmit spring loading between the spring washer and the spring seating member transversely of the coiling axis of the coil means, said spring washer having axially spaced apart inner and outer edges operatively engaged with the two relatively rotatable parts provided by said spring seating member and said spring washer, respectively, to restrict relative rotation therebetween under normal spring loading, said coil means moving said edges toward one another under increased spring load occurring when the valve is moved against the bias of said coil spring to open the port so that one of the edges will be moved out of operative engagement with a corresponding one of the parts, thereby removing the restriction against relative rotation between the parts, the coils of said coil means tipping in response thereto to rotatably drive the parts, thereby rotating the valve with respect to the engine part, and to concurrently decrease the axial spacing dimension between said spring washer and said spring seating member, whereupon said edges will again engage a corresponding part and said coils and said spring washer will resume normal shape and disposition upon unloading of the valve.

21. A valve rotating device comprising an engine part having a port to be controlled, a valve having a stem reciprocably supported in said engine part and having a head controlling the flow of fluid through said port, a coil spring surrounding said stem and operatively connected between said engine part and said valve to exert a continuous biasing force on said valve, a retainer cap on the end of said valve stem, one end of said coil spring being bottomed against said engine part, an annular spring seating member having one radial face engaging the other end of said coil spring and having an opposite radial face confronting said retainer cap, an annular bowed spring washer between said retainer cap and said spring seating member, and helically wound coil means having the opposite sides of the coils engaging said spring washer and said retainer cap, respectively, to transmit between the spring washer and the retainer cap spring loading transversely of the coiling axis of said coil means, said spring washer having axially spaced apart inner and outer edges operatively engaged with the two relatively rotatable parts provided by said retainer cap and said spring washer, respectively, to restrict relative rotation therebetween under normal spring loading, said coil means moving said edges toward one another under increased spring load when the valve is moved against the bias of said coil spring to open the port so that one of the edges will be moved out of operative engagement with a corresponding one of the parts, thereby removing the restriction against relative rotation between the parts, the coils of said coil means tipping in response thereto to rotatably drive the parts, thereby rotating the valve with respect to the engine part, and to concurrently decrease the axial spacing dimension between said spring washer and said retainer cap, whereupon said edges will again engage a corresponding part and said coils and said spring washer will resume normal shape and disposition upon unloading of the valve.

22. A valve rotating device comprising first and second annular channel shaped members each having concentrically spaced inner and outer walls separated by a web adapted to engage an adjoining wall support and adapted to bottom the end of a valve spring, respectively, the outer wall of one of said members lying circumjacent the outer wall of the other of said members, said inner walls of said members having cooperating flanges formed therebetween to effect a slidable connection between the members, a conical spring washer interposed between said webs having inner and outer longitudinally spaced edges engaging adjoining surface portions of said first and second members, spring means providing helically wound coils between one of said members and said spring washer transmitting forces transversely of said spring coils and moving said spring washer out of engagement with one of said first and second members under increased load, whereupon said coils will tilt to rotatably drive the first and second members with respect to one another, and confining means for restricting said coils against kinking.

23. A valve rotating device as defined in claim 22, said confining means including a ring-like collar member lying circumjacent the coils of the spring means.

24. A valve rotating device comprising first and second annular members having concentrically circumjacent peripheral portions and axially spaced surface portions extending generally radially outwardly from the axis of said members, a conical spring washer interposed between said surface portions having inner and outer axially spaced edge portions engaging adjoining surface portions of said members, spring means providing helically wound coils between one of said members and said spring washer transmitting forces transversely of said spring coils and moving said spring washer out of engagement with one of said first and second members under increased load, whereupon said coils will tilt to rotatably drive the first and second members with respect to one another, and confining means for restricting said coils against kinking.

25. A valve rotating device as defined in claim 24, said confining means including a ring-like collar member lying circumjacent the coils of the spring means.

26. A valve rotating device as defined in claim 24, said confining means including a flange formed on one of said members to lie circumjacent the coils of the spring means.

References Cited in the file of this patent

UNITED STATES PATENTS 2,397,502    Ralston _____ Apr. 2, 1946